(12) United States Patent
Lorenz et al.

(10) Patent No.: US 11,177,662 B2
(45) Date of Patent: Nov. 16, 2021

(54) MONITORING OF A HIGH-VOLTAGE DC TRANSMISSION

(71) Applicant: Siemens Energy Global GmbH & Co. KG, Munich (DE)

(72) Inventors: Andreas Lorenz, Erlangen (DE); Ewgenij Starschich, Wilhermsdorf (DE); Mustafa Baris Karacay, Erlangen (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 0 days.

(21) Appl. No.: 17/056,496

(22) PCT Filed: May 18, 2018

(86) PCT No.: PCT/EP2018/063212
§ 371 (c)(1),
(2) Date: Nov. 18, 2020

(87) PCT Pub. No.: WO2019/219217
PCT Pub. Date: Nov. 21, 2019

(65) Prior Publication Data
US 2021/0194247 A1 Jun. 24, 2021

(51) Int. Cl.
*H02J 3/36* (2006.01)
*H02H 3/44* (2006.01)

(52) U.S. Cl.
CPC .............. *H02J 3/36* (2013.01); *H02H 3/445* (2013.01)

(58) Field of Classification Search
CPC ............ H02J 3/36; H02M 1/32; H02M 7/483; H02M 2007/4835; H02M 7/7575; H02H 3/087; H02H 3/16; H02H 3/445
See application file for complete search history.

(56) References Cited

U.S. PATENT DOCUMENTS 3,982,158 A * 9/1976 Knauer .................. H02H 3/025
361/87
5,187,651 A 2/1993 Ekstroem
(Continued)

FOREIGN PATENT DOCUMENTS

CN 104953568 A 9/2015
CN 105552947 A 5/2016
(Continued)

OTHER PUBLICATIONS

Sun Yuanbing et al.: "Lineprotection scheme for multistage DC power distribution system based on current changing rate", Journal of Xi'an University of Technology (2015), vol. 31, No. 2—English abstract.

*Primary Examiner* — Fred E Finch, III
(74) *Attorney, Agent, or Firm* — Laurence A. Greenberg; Werner H. Stemer; Ralph E. Locher

(57) ABSTRACT

In a method for monitoring a high-voltage DC transmission the following are predefined: an amperage threshold value for an amperage of the high-voltage DC transmission, at least one interval length for time intervals and, for each predefined interval length, a change threshold value for a change in the amperage averaged over time intervals of the interval length. The amperage for each terminal of the high-voltage DC transmission is determined, and a change in the amperage averaged over time intervals of the interval length is determined for each predefined interval length. A DC error is determined if the magnitude of the amperage of at least one terminal is greater than the amperage threshold value or if, for an interval length, the magnitude of the averaged change in the amperage of at least one terminal is greater than the change threshold value predefined for the interval length.

11 Claims, 5 Drawing Sheets

(56) References Cited

U.S. PATENT DOCUMENTS

| | | | |
|---|---|---|---|
| 8,830,708 | B2 | 9/2014 | Berggren et al. |
| 10,615,587 | B2 | 4/2020 | Gupta et al. |
| 10,763,742 | B2 | 9/2020 | Gupta et al. |
| 2012/0201059 | A1* | 8/2012 | Berggren ............... H02H 7/268 363/53 |
| 2015/0009594 | A1* | 1/2015 | Okaeme .................... H02J 1/02 361/42 |
| 2015/0015066 | A1* | 1/2015 | Dong ....................... H02H 3/16 307/18 |
| 2018/0145499 | A1* | 5/2018 | Gupta ..................... H02H 3/16 |
| 2018/0212533 | A1* | 7/2018 | Nami .................... H02J 3/1842 |
| 2018/0287371 | A1* | 10/2018 | Nyberg .................. H02M 1/32 |
| 2019/0305669 | A1* | 10/2019 | Gupta ....................... H02J 3/36 |
| 2020/0412128 | A1* | 12/2020 | Roy-Choudhury .......................... H02H 7/1257 |

FOREIGN PATENT DOCUMENTS

| | | |
|---|---|---|
| CN | 105680424 A | 6/2016 |
| CN | 107431428 A | 12/2017 |
| CN | 107534296 A | 1/2018 |
| EP | 2830200 A1 | 1/2015 |
| GB | 2537851 A | 11/2016 |
| RU | 2089986 C1 | 9/1997 |
| RU | 2417500 C1 | 4/2011 |
| WO | WO9963641 A1 | 12/1999 |
| WO | WO2014132396 A1 | 9/2014 |
| WO | WO2016156416 A1 | 10/2016 |

* cited by examiner

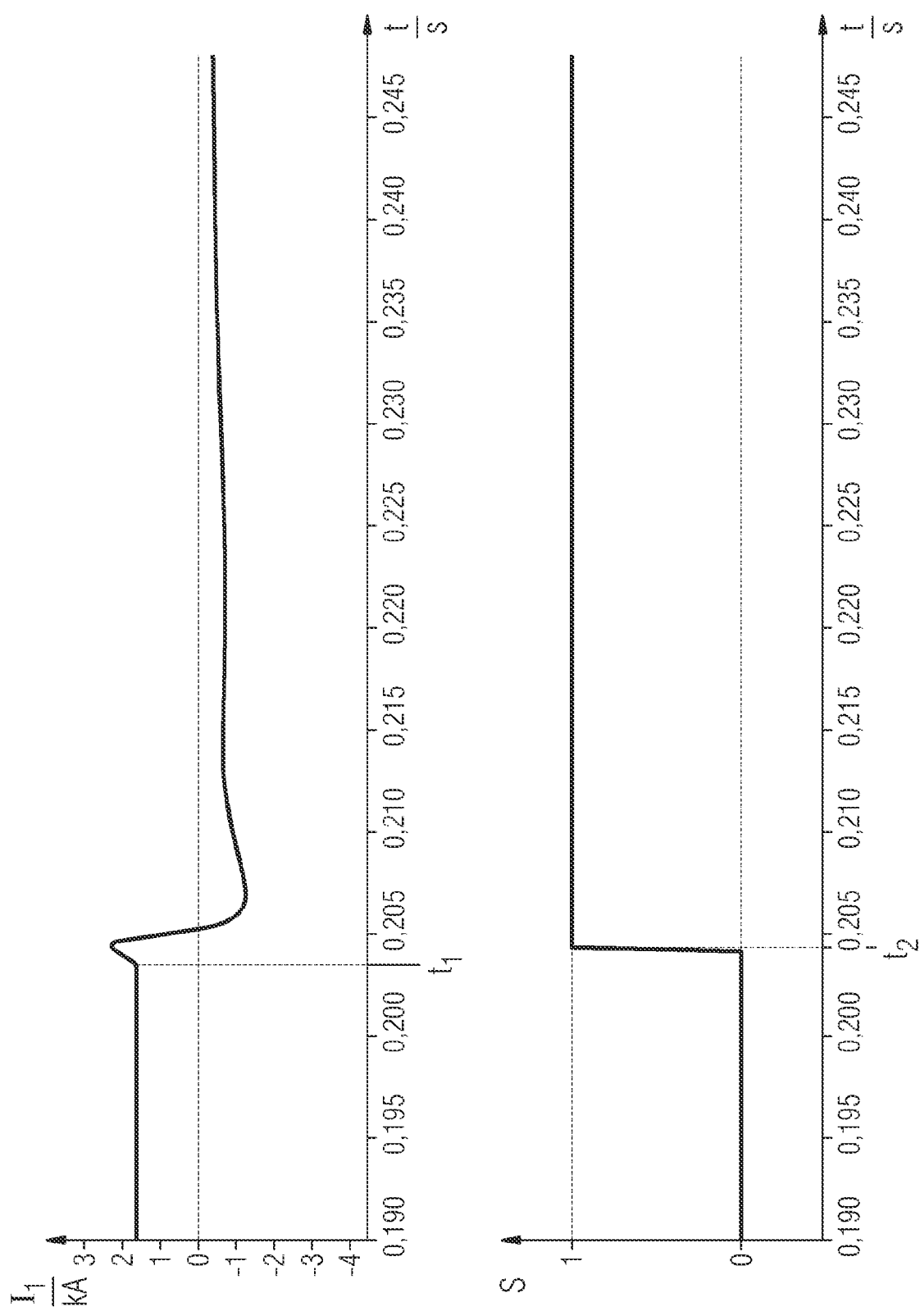

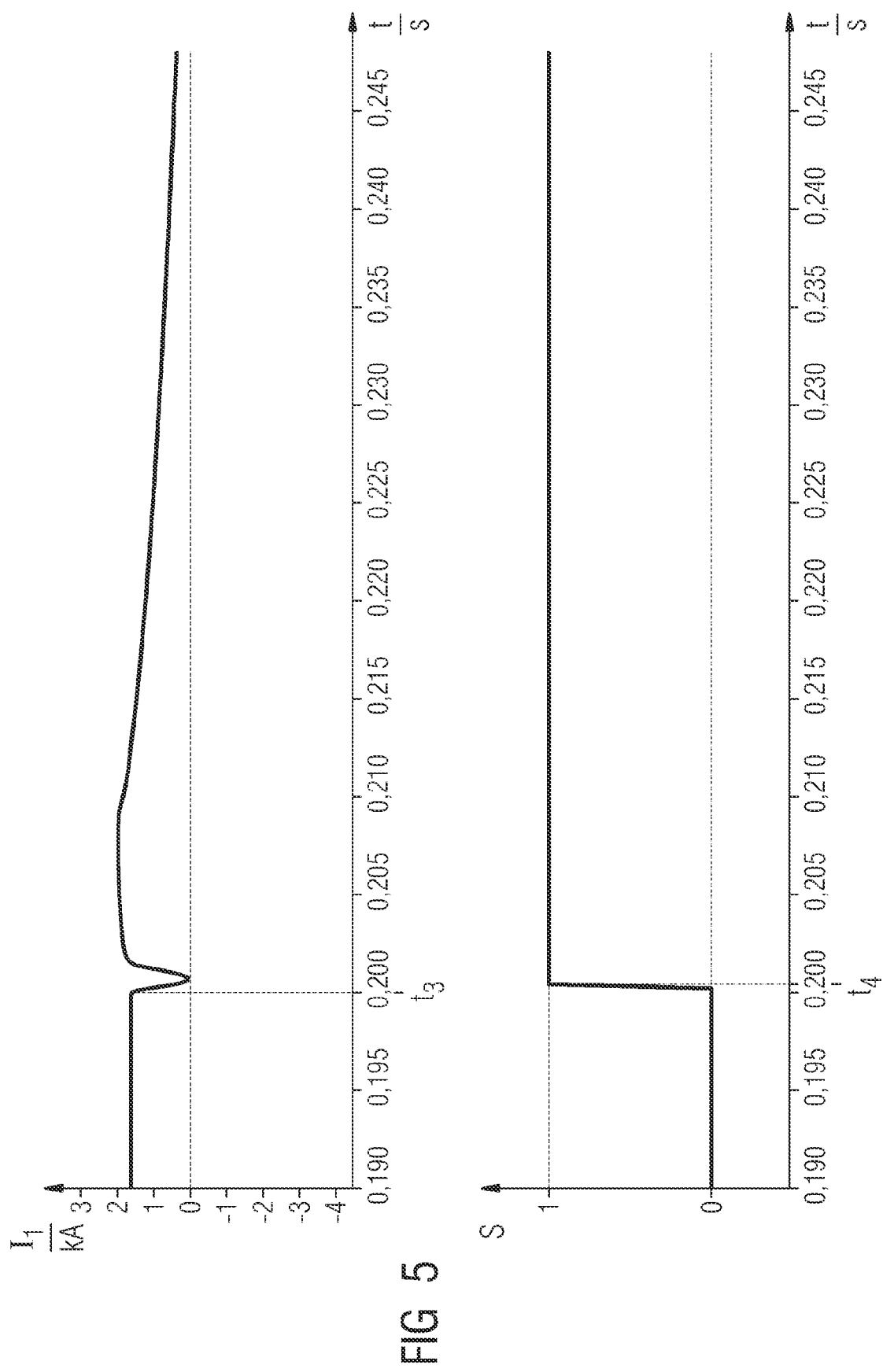

MONITORING OF A HIGH-VOLTAGE DC TRANSMISSION

BACKGROUND OF THE INVENTION

Field of the Invention

The invention relates to a method for monitoring a high-voltage DC transmission between two power converter stations and to a power converter station designed for implementing the method for a high-voltage DC transmission.

Electrical energy between AC power supply systems is often transmitted at a high DC voltage over long distances since the energy transmission with DC voltage over long distances is less subject to losses and less expensive than energy transmission with AC voltage. This type of energy transmission is referred to as high-voltage DC transmission (HVDC transmission) over a high-voltage DC transmission path (HVDC transmission path).

In order to connect an HVDC transmission path to an AC power supply system, a power converter station is arranged between the AC power supply system and one end of the HVDC transmission path, in which power converter station the conversion between alternating current and AC voltage of the AC power supply system and direct current and DC voltage of the HVDC transmission takes place. The energy transmission between the AC power supply system and the HVDC transmission path can in this case take place in monopolar, symmetrically monopolar or bipolar fashion. In the case of a symmetrically monopolar energy transmission and in the case of a bipolar energy transmission, two poles are used, wherein a high voltage which is positive with respect to a ground potential is present at one pole, and a high voltage which is negative with respect to the ground potential is present at the other pole. In the case of a symmetrically monopolar energy transmission, both poles are connected to the AC power supply system by the same power converter station, and in the case of a bipolar energy transmission, the two poles are connected to the AC power supply system by different power converter stations.

An HVDC transmission can be impaired by DC faults. For example, a ground fault may occur, in which a pole of the HVDC transmission is connected to a ground potential. In addition, in the case of a symmetrically monopolar HVDC transmission, a pole-to-pole fault may occur, in which the two poles are short-circuited. In both cases, the power converter stations of the HVDC transmission are blocked and isolated from the respective AC power supply system when the power converter stations are embodied using conventional half-bridge technology. In order to reduce a load on the power converter stations and other HVDC transmission components, in particular the transmission lines, in such fault cases, quick identification of such DC faults is required in order to be able to avoid or limit damage owing to the DC faults.

SUMMARY OF THE INVENTION

The invention is based on the object of specifying a method for monitoring an HVDC transmission and a power converter station for an HVDC transmission which are improved in particular in respect of the identification of DC faults.

The object is achieved according to the invention by a method having the features of as claimed and a power converter station as claimed.

Advantageous configurations of the invention are the subject matter of the dependent claims.

In the method according to the invention for monitoring an HVDC transmission between two power converter stations, a current intensity threshold value for a current intensity of the HVDC transmission, at least one interval length for time intervals and, for each preset interval length, a change threshold value for a current intensity change in the current intensity of the HVDC transmission, averaged over time intervals of the interval length, are preset. For each pole of the HVDC transmission, the current intensity and, for each preset interval length, a current intensity change in the current intensity, averaged over time intervals of the interval length, are determined. For each pole of the HVDC transmission, the absolute value of the current intensity is compared with the preset current intensity threshold value, and for each preset interval length, the absolute value of the averaged current intensity change is compared with the change threshold value preset for the interval length. It is concluded that there is a DC fault when the absolute value of the current intensity of at least one pole is greater than the current intensity threshold value or, for an interval length, the absolute value of the averaged current intensity change in the current intensity of at least one pole is greater than the change threshold value preset for the interval length.

The current intensity of a pole is in this case understood to mean a current intensity of an electrical direct current which is flowing in a transmission line of the HVDC transmission associated with this pole. Correspondingly, in the text which follows, the current of a pole is understood to mean a direct current which is flowing in a transmission line of the HVDC transmission associated with this pole.

The recording and evaluation of the current intensity and of the current intensity change of each pole of the HVDC transmission according to the invention advantageously enables very quick identification of a DC fault such as a ground fault or a pole-to-pole fault. As a result, it is possible to respond very quickly to a DC fault in order to avoid or reduce damage owing to the DC fault and to reduce an interruption period of the HVDC transmission owing to the DC fault. In particular, a reactive power can be made available without interruption for power supply system stabilization, and a voltage load caused by a DC fault for components which are used for the HVDC transmission, in particular for transmission lines of the HVDC transmission, is reduced, as a result of which the life of the components is extended. The invention makes it possible, for example, to resume active power transmission in the event of a temporary DC fault after an interruption period of less than 800 ms. Owing to the reduction in the voltage load, it is additionally also possible to reduce an insulation rating for the electrical insulation of the transmission lines of the HVDC transmission.

One configuration of the invention provides that, in the event of an identified DC fault, the current of each pole is regulated to zero by activation of a power converter, assigned to the pole, of a power converter station. In other words, in the event of an identified DC fault, for each pole of the HVDC transmission, the regulation of a power converter, assigned to the pole, of a power converter station is switched over to a current regulation which regulates the current of the pole to zero. As a result, a quick reduction in fault currents is advantageously made possible in the event of DC faults.

A further configuration of the invention provides that, in the case of a symmetrically monopolar HVDC transmission, after the regulation of the currents of the poles to zero, a pole charged by the DC fault is discharged. This configuration of the invention takes into consideration the fact that, in the case of a symmetrically monopolar HVDC transmission, when there is a ground fault at one pole, the other pole is charged, i.e. the absolute value of the high voltage present at this pole increases, for example up to the value of the voltage difference between the two poles during fault-free operation. The invention therefore makes it possible in particular to identify and handle an asymmetrical ground fault of a symmetrically monopolar HVDC transmission. For example, a regulation time period for the regulation of the currents of the poles to zero is preset, and the pole charged by the DC fault is discharged once the regulation time period has expired. The regulation time period is, for example, between 100 ms and 500 ms. The discharge of the charged pole according to the invention after the regulation of the currents of the poles to zero advantageously reduces the voltage load on the components of the HVDC transmission which are connected to the charged pole.

A further configuration of the invention provides that two different interval lengths for time intervals are preset. For example, a first interval length is between 100 µs and 500 µs, and the second interval length is between 500 µs and 2 ms. This configuration of the invention therefore provides that the current intensity change for each pole is averaged and evaluated separately over time intervals of two different interval lengths. As a result, consideration is taken of the fact that DC faults can cause current intensity changes on different time scales. The evaluation of a current intensity change averaged over time intervals of between 100 µs and 500 µs makes it possible to identify quick changes in the current intensity which typically occur in the event of DC faults of an HVDC transmission. The evaluation of a current intensity change averaged over time intervals of between 500 µs and 2 ms makes it possible to identify slower changes in the current intensity which typically occur in the event of DC faults of an HVDC transmission, in particular in the case of changes where the mathematical sign of the current intensity changes.

A power converter station according to the invention for an HVDC transmission comprises a measuring device, which is designed to repeatedly record, for each pole of the HVDC transmission, a current intensity and a current intensity change in the current intensity, and a control unit, which is designed to compare, for each pole, the absolute value of the current intensity with a preset current intensity threshold value, and to form, for at least one preset interval length, a current intensity change averaged over time intervals of the interval length from the current intensity change in the current intensity of the pole, and to compare the absolute value of said averaged current intensity change with a change threshold value preset for the interval length, and to conclude that there is a DC fault when the absolute value of the current intensity of at least one pole is greater than the current intensity threshold value or, for an interval length, the absolute value of the averaged current intensity change in the current intensity of at least one pole is greater than the change threshold value preset for the interval length.

One configuration of a power converter station according to the invention provides that each power converter of the power converter station is designed to build up a back-EMF, which counteracts charging of a pole to which the power converter is assigned. For example, the power converter is designed for this purpose as a full-bridge power converter or has a sufficient number of power converter modules in the form of full bridges. In this case, the control unit is designed in particular to regulate the current of each pole to zero in the event of an identified DC fault by activation of a power converter, assigned to the pole, of the power converter station.

A further configuration of a power converter station according to the invention provides that, in the case of a symmetrically monopolar HVDC transmission, the control unit is designed to initiate discharge of a pole charged by the DC fault after the regulation of the currents of the poles to zero. In this case, provision can be made for the control unit to be designed to regulate the currents of the poles to zero during a preset regulation time period, and to initiate the discharge of the pole charged by the DC fault once the regulation time period has expired.

Each power converter of the power converter station is additionally in the form of, for example, a self-commutated power converter (VSC=voltage source converter) and/or in the form of a modular multilevel power converter.

A power converter station according to the invention makes it possible to implement the method according to the invention. The advantages of a power converter station according to the invention therefore correspond to the abovementioned advantages of the method according to the invention and will not be listed here separately again.

The above-described properties, features and advantages of this invention as well as the way in which these are achieved will become clearer and more easily understandable in connection with the following description of exemplary embodiments which will be explained in more detail in relation to the drawings, in which:

BRIEF DESCRIPTION OF THE SEVERAL VIEWS OF THE DRAWING

FIG. 5 shows characteristics of a current intensity of an HVDC transmission at the location of a second power converter station and of a trigger signal of the second power converter station in the event of a DC fault.

DETAILED DESCRIPTION OF THE INVENTION

Mutually corresponding parts are provided with the same reference symbols in the figures.

Figure 1:
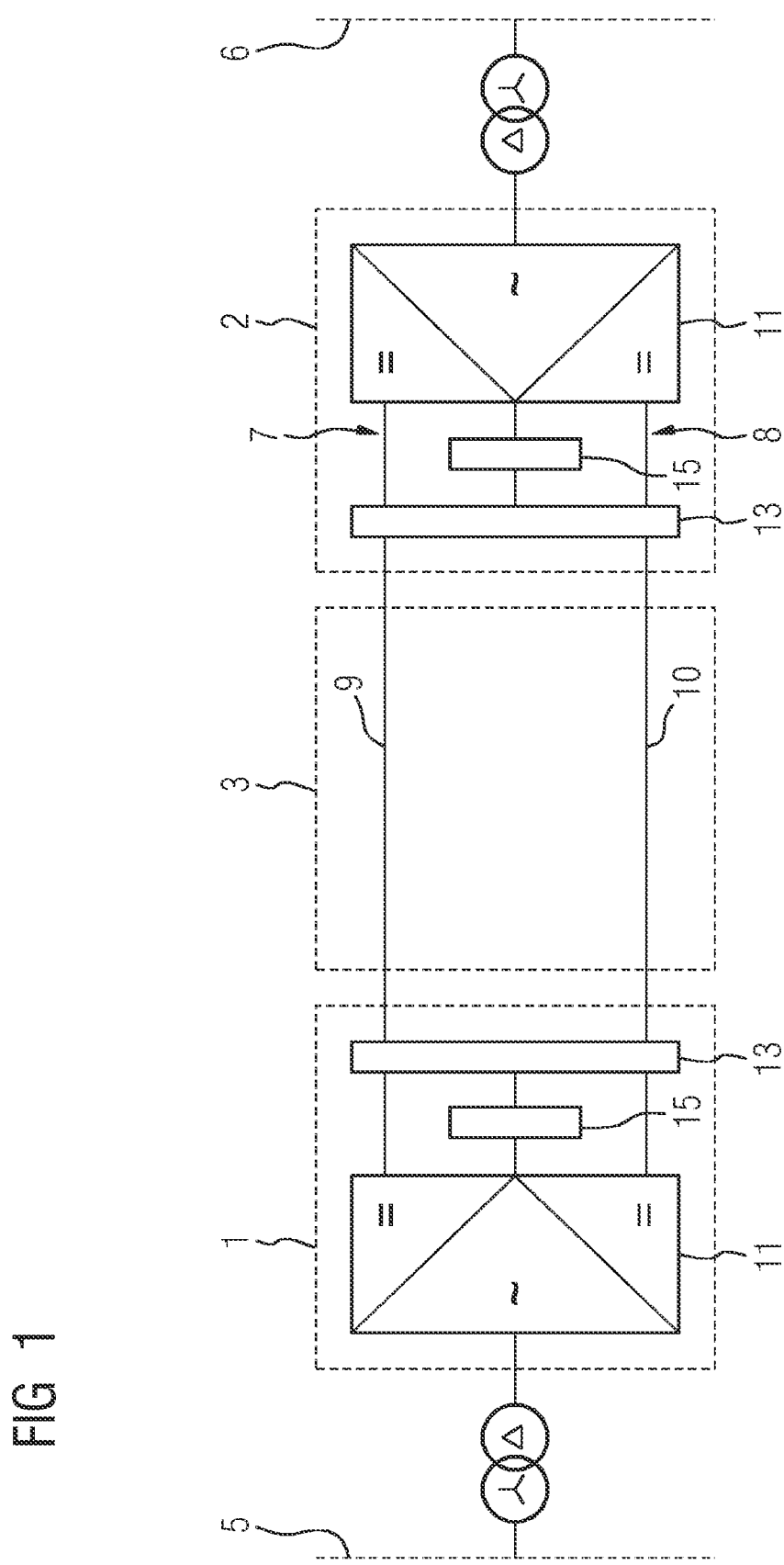
FIG. 1 shows a schematic illustration of two power converter stations and an HVDC transmission path of an HVDC transmission between two AC power supply systems.

FIG. 1 shows a schematic illustration of two power converter stations 1, 2 of an HVDC transmission, which are connected to one another on the DC side via an HVDC transmission path 3. A first power converter station 1 is connected on the AC side to a first AC power supply system 5. The second power converter station 2 is connected on the AC side to a second AC power supply system 6.

The HVDC transmission is designed to be symmetrically monopolar with a first pole 7 and a second pole 8. The HVDC transmission path 3 has a first transmission line 9 for the first pole 7 and a second transmission line 10 for the second pole 8.

Each power converter station 1, 2 has a power converter unit 11, a measuring device 13 and a control unit 15.

Each power converter unit 11 has, for each pole 7, 8, a self-commutated power converter, which, depending on the energy transmission direction, can be used as a rectifier for converting an alternating current and an AC voltage of the respective AC power supply system 5, 6 into a direct current and a DC voltage of the HVDC transmission or as an inverter for converting a direct current and a DC voltage of the HVDC transmission into an alternating current and an AC voltage of the respective AC power supply system 5, 6 and is in the form of, for example, a modular multilevel power converter.

The measuring device 13 of each power converter station 1, 2 is designed to record, for a first pole 7 of the HVDC transmission, a first current intensity $I_1$ and a first current intensity change $\dot{I}_1$ in the first current intensity $I_1$ and, for the second pole 8 of the HVDC transmission, a second current intensity $I_2$ and a second current intensity change $\dot{I}_2$ in the second current intensity $I_2$ at the location of the respective power converter station 1, 2.

Each control unit 15 is designed to implement the method steps S3 to S6 of the method described with reference to FIG. 2.

Figure 2:
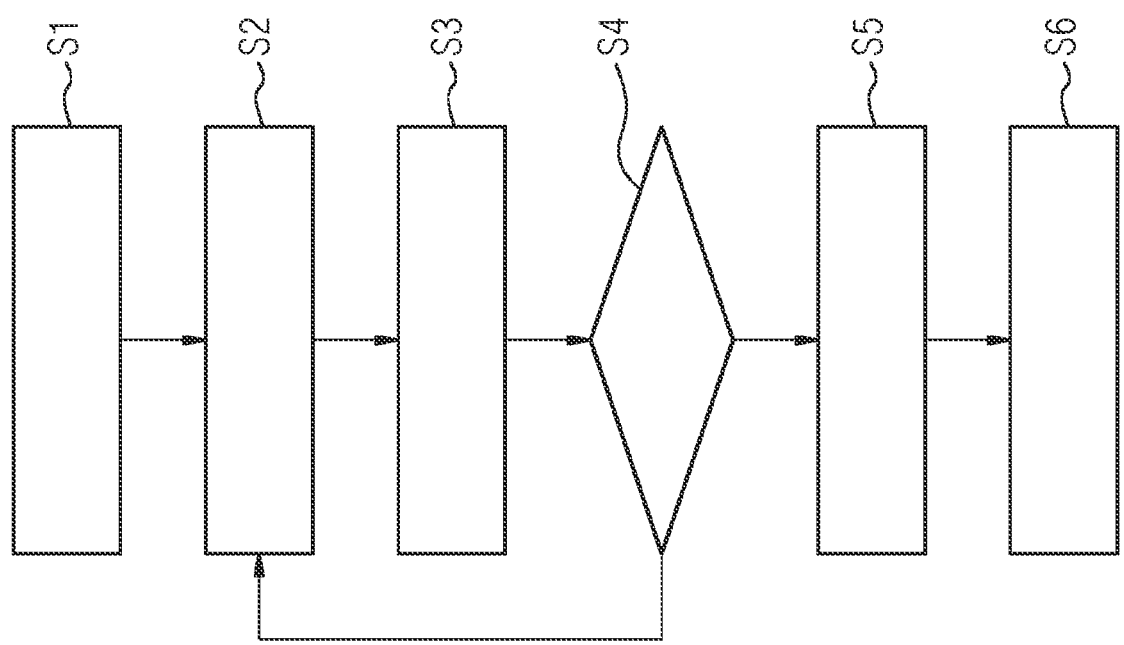
FIG. 2 shows a flowchart of a method for monitoring an HVDC transmission.

FIG. 2 shows a flowchart of an exemplary embodiment of the method according to the invention for monitoring the HVDC transmission between the two power converter stations 1, 2 comprising method steps S1 to S6. The method is implemented by each power converter station 1, 2 independently of the other power converter station 1, 2, i.e. the method steps S1 to S6 described below relate in each case to one power converter station 1, 2 and the power converter unit 11, measuring device 13 and control unit 15 thereof.

In a first method step S1, a current intensity threshold value L1 for the current intensities $I_1$, $I_2$ of the poles 7, 8, two different interval lengths $T_1$, $T_2$ for time intervals and, for each preset interval length $T_1$, $T_2$, a change threshold value L2, L3 for a current intensity change in each current intensity $I_1$, $I_2$, averaged over time intervals of the interval length $T_1$, $T_2$, are preset. For example, a first interval length $T_1$ is between 100 μs and 500 μs, and the second interval length $T_2$ is between 500 μs and 2 ms.

In a second method step S2, for each pole 7, 8 of the HVDC transmission, the current intensity $I_1$, $I_2$ and the current intensity change $\dot{I}_1$, $\dot{I}_2$ in the current intensity $I_1$, $I_2$ are recorded by the measuring device 13.

In a third method step S3, for each preset interval length $T_1$, $T_2$, a current intensity change averaged over time intervals of the interval length $T_1$, $T_2$ is formed by the control unit 15 from the current intensity change $\dot{I}_1$, $\dot{I}_2$ in the current intensity $I_1$, $I_2$ of each pole 7, 8, which change was recorded by the measuring device 13 in the second method step S2.

In a fourth method step S4, for each pole 7, 8, the absolute value of the current intensity $I_1$, $I_2$ recorded by the measuring device 13 in the second method step S2 is compared by the control unit 15 with the current intensity threshold value L1 preset in the first method step S1. In addition, in the fourth method step S4, for each pole 7, 8 and for each preset interval length $T_1$, $T_2$, the absolute value of the averaged current intensity change formed in the third method step S3 is compared by the control unit 15 with the change threshold value L2, L3 preset for the interval length $T_1$, $T_2$ in the first method step S1. When the absolute value of the current intensity $I_1$, $I_2$ of at least one pole 7, 8 is greater than the current intensity threshold value L1 or, for an interval length $T_1$, $T_2$, the absolute value of the averaged current intensity change in the current intensity $I_1$, $I_2$ of at least one pole 7, 8 is greater than the change threshold value L2, L3 preset for the interval length $T_1$, $T_2$, it is concluded that there is a DC fault, and the method is continued with a fifth method step S5. Otherwise, the method is continued with the second method step S2.

Figure 3:
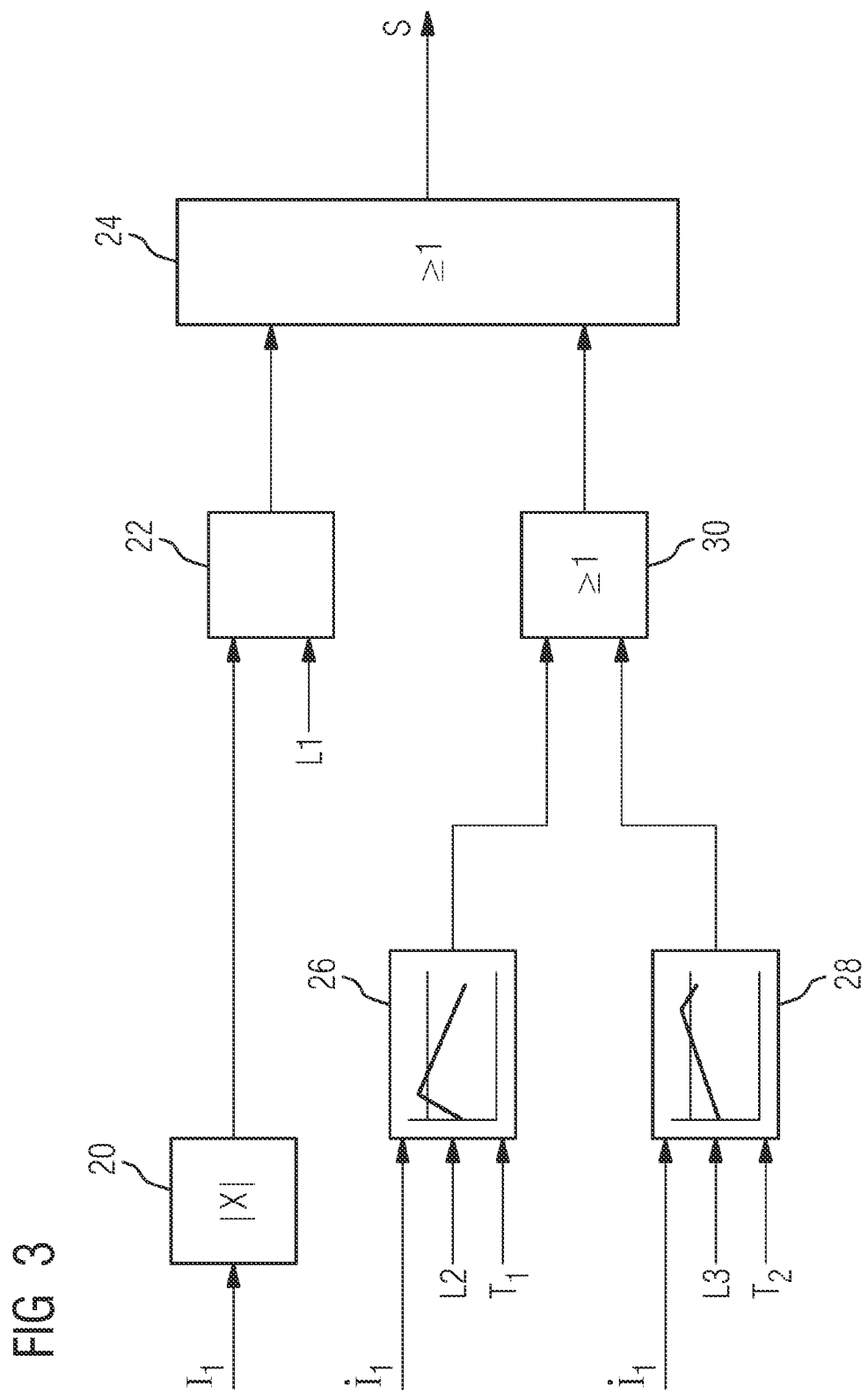
FIG. 3 shows a block diagram for the evaluation of a current intensity and a current intensity change of a pole of an HVDC transmission, FIG. 4 show characteristics of a current intensity of an HVDC transmission at the location of a first power converter station and of a trigger signal of the first power converter station in the event of a DC fault.

FIG. 3 shows a schematic illustration of a block diagram for implementing the method steps S3 and S4 for the first pole 7. The first current intensity $I_1$ recorded in the second method step S2 is passed to an absolute value generator 20, which generates the absolute value of the first current intensity $I_1$. The absolute value of the first current intensity $I_1$ is compared with the current intensity threshold value L1 by a comparator 22. When the absolute value of the first current intensity $I_1$ is greater than the current intensity threshold value L1, the comparator 22 outputs a one as output signal to a first OR element 24; otherwise the comparator 22 outputs a zero as output signal to the first OR element 24.

The first current intensity change $\dot{I}_1$ recorded in the second method step S2 is in each case passed to a first evaluator 26 and a second evaluator 28. The first evaluator 26 averages the first current intensity change $\dot{I}_1$ over a time interval of the first interval length $T_1$ and compares the absolute value of the averaged first current intensity change with a first change threshold value L2. When the absolute value of the averaged first current intensity change is greater than the first change threshold value L2, the first evaluator 26 outputs a one as output signal to a second OR element 30; otherwise the first evaluator 26 outputs a zero as output signal to the second OR element 30.

Correspondingly, the second evaluator 28 averages the first current intensity change $\dot{I}_1$ over a time interval of the second interval length $T_2$ and compares the absolute value of the averaged first current intensity change with the second change threshold value L3. When the absolute value of the averaged first current intensity change is greater than the second change threshold value L3, the second evaluator 28 outputs a one as output signal to the second OR element 30; otherwise the second evaluator 28 outputs a zero as output signal to the second OR element 30.

The output signal of the second OR element 30 is passed to the first OR element 24. The first OR element 24 therefore outputs a one as a trigger signal S when the absolute value of the first current intensity $I_1$ is greater than the current intensity threshold value L1 or the absolute value of the first current intensity change, averaged over a time interval of the first interval length $T_1$, is greater than the first change threshold value L2 or the absolute value of the first current intensity change, averaged over a time interval of the second interval length $T_2$, is greater than the second change threshold value L3. Otherwise, the first OR element 24 outputs a zero as trigger signal S.

The absolute value generator 20, the comparator 22, the OR elements 24, 30 and the evaluators 26, 28 can be embodied as hardware components of the control unit 15 or as program steps in a software run by the control unit 15.

In the fifth method step S5, the current of each pole 7, 8 is regulated to zero by the control unit 15 by activation of the power converter, assigned to the pole 7, 8, of the power converter station 1, 2. The regulation is triggered when the trigger signal S of the control unit 15 assumes the value one.

FIGS. 4 and 5 show, by way of example, characteristics of the first current intensity $I_1$ at the locations of the power converter stations 1, 2 and of the trigger signals S of the power converter stations 1, 2 in the event of a ground fault at the first pole 7. In this case, it has been assumed that the power converters of the power converter unit 11 of the first power converter station 1 are operated as rectifiers, the power converters of the power converter unit 11 of the second power converter station 2 are operated as inverters, and the ground fault occurs in the vicinity of the second power converter station 2.

FIG. 4 shows the characteristic of the first current intensity $I_1$ at the location of the first power converter station 1 and the characteristic of the trigger signal S of the first power converter station 1. The ground fault brings about an increase in the first current intensity $I_1$ at the location of the first power converter station 1 from a first time $t_1$. The first power converter station 1 records this increase and responds to it in accordance with the method steps S2 to S5. The regulation of the first current intensity $I_1$ to zero by the first power converter station 1 in accordance with the fifth method step S5 starts at a second time $t_2$, at which the trigger signal S of the first power converter station 1 assumes the value one. A response time of, for example, 500 μs is between the first time $t_1$ and the second time $t_2$. After the second time $t_2$, the first current intensity $I_1$ first decreases owing to the regulation, wherein its mathematical sign changes, and then increases again slowly and approaches the value zero.

FIG. 5 shows the characteristic of the first current intensity $I_1$ at the location of the second power converter station 2 and the characteristic of the trigger signal S of the second power converter station 2. The ground fault brings about a drop in the first current intensity $I_1$ at the location of the second power converter station 2 from a third time $t_3$, which is before the first time $t_1$, since the ground fault occurs in the vicinity of the second power converter station 2 and therefore has more effect at this location than at the location of the first power converter station 1. Correspondingly, the second power converter station 2 responds to the ground fault at a fourth time $t_4$, which is before the second time $t_2$ and, for example, 500 μs after the third time $t_3$.

If, owing to the DC fault, one of the poles 1, 2 has been charged, the control unit 15 initiates, in a sixth method step S6, the discharge of the charged pole 1, 2. For example, for this purpose a regulation time period for the regulation of the currents of the poles 7, 8 in the fifth method step S5 is preset, and the sixth method step S6 is implemented once the regulation time period has expired. The regulation time period is, for example, between 100 ms and 500 ms.

Although the invention has been illustrated and described in more detail using preferred exemplary embodiments, the invention is not restricted by the disclosed examples, and other variations can be derived therefrom by a person skilled in the art without departing from the scope of protection of the invention.

LIST OF REFERENCE SYMBOLS

1, 2 power converter station
3 HVDC transmission path
5, 6 AC power supply system
7, 8 pole
9, 10 transmission line
11 power converter unit
13 measuring device
15 control unit
20 absolute value generator
22 comparator
24, 30 OR element
26, 28 evaluator
$I_1$, $I_2$ current intensity
$\dot{I}_1$, $\dot{I}_2$ current intensity change
L1 current intensity threshold value
L2, L3 change threshold value
S trigger signal
S1 to S6 method step
t time
$t_1$ to $t_4$ time
$T_1$, $T_2$ interval length

The invention claimed is:

1. A method for monitoring HVDC transmission between two power converter stations, the method comprising:
   presetting a current intensity threshold value for a current intensity of the HVDC transmission;
   presetting at least one interval length for time intervals, and setting for each preset interval length a change threshold value for a current intensity change in the current intensity of the HVDC transmission, averaged over time intervals of the interval length;
   for each pole of the HVDC transmission, determining the current intensity, and for each preset interval length, determining a current intensity change in the current intensity, averaged over time intervals of the interval length;
   for each pole of the HVDC transmission, comparing an absolute value of the current intensity with the preset current intensity threshold value, and for each preset interval length, comparing an absolute value of the averaged current intensity change with the change threshold value preset for the interval length;
   concluding a DC fault when the absolute value of the current intensity of at least one pole is greater than the current intensity threshold value or, for an interval length, the absolute value of the averaged current intensity change in the current intensity of at least one pole is greater than the change threshold value preset for the interval length;
   in the event of an identified DC fault, regulating a current of each pole to zero by activating a power converter, assigned to the respective pole, of a power converter station; and
   after the regulation of the currents of the poles to zero, discharging the respective pole charged by the DC fault.

2. The method according to claim 1, which comprises presetting a regulation time period for regulating the currents of the poles to zero, and discharging the pole charged by the DC fault once the regulation time period has expired.

3. The method according to claim 2, which comprises setting the regulation time period to between 100 ms and 500 ms.

4. A method for monitoring an HVDC transmission between two power converter stations, the method comprising:
   presetting a current intensity threshold value for a current intensity of the HVDC transmission;
   presetting two different interval lengths for time intervals, and setting for each preset interval length a change threshold value for a current intensity change in the current intensity of the HVDC transmission, averaged over time intervals of the interval length;
   for each pole of the HVDC transmission, determining the current intensity, and for each preset interval length, determining a current intensity change in the current intensity, averaged over time intervals of the interval length;

for each pole of the HVDC transmission, comparing an absolute value of the current intensity with the preset current intensity threshold value, and for each preset interval length, comparing an absolute value of the averaged current intensity change with the change threshold value preset for the interval length; and concluding a DC fault when the absolute value of the current intensity of at least one pole is greater than the current intensity threshold value or, for an interval length, the absolute value of the averaged current intensity change in the current intensity of at least one pole is greater than the change threshold value preset for the interval length.

5. The method according to claim 4, wherein a first interval length lies between 100 μs and 500 μs, and a second interval length lies between 500 μs and 2 ms.

6. A power converter station for an HVDC transmission, the power converter station comprising:

a measuring device configured to repeatedly record, for each pole of the HVDC transmission, a current intensity and a current intensity change in the current intensity; and a control unit configured to compare, for each pole, an absolute value of the current intensity with a preset current intensity threshold value, and to form, for at least one preset interval length, a current intensity change averaged over time intervals of the interval length from the current intensity change in the current intensity of the pole, and to compare the absolute value of said averaged current intensity change with a change threshold value preset for the interval length, and to conclude that there is a DC fault when the absolute value of the current intensity of at least one pole is greater than the current intensity threshold value or, for an interval length, the absolute value of the averaged current intensity change in the current intensity of at least one pole is greater than the change threshold value preset for the interval length;

wherein each power converter of the power converter station is configured to build up a counter-voltage for counteracting a charging of a pole to which the power converter is assigned;

said control unit is configured to regulate the current of each pole to zero in the event of an identified DC fault by activating a power converter, assigned to the pole, of the power converter station; and said control unit is configured to initiate discharge of a pole charged by the DC fault after the regulation of the currents of the poles to zero.

7. The power converter station according to claim 6, wherein said control unit is configured to regulate the currents of the poles to zero during a preset regulation time period, and to initiate the discharge of the pole charged by the DC fault once the regulation time period has expired.

8. The power converter station according to claim 7, wherein each power converter of the power converter station is a self-commutated power converter.

9. The power converter station according to claim 7, wherein each power converter of the power converter station is a modular multilevel power converter.

10. The power converter station according to claim 6, wherein each power converter of the power converter station is a self-commutated power converter.

11. The power converter station according to claim 6, wherein each power converter of the power converter station is a modular multilevel power converter.

* * * * *